United States Patent
Dobashi

(10) Patent No.: US 11,105,604 B2
(45) Date of Patent: Aug. 31, 2021

(54) METHOD AND APPARATUS OF MEASURING AXIAL CLEARANCE OF BALL SCREW DEVICE, AND METHODS OF MANUFACTURING BALL SCREW DEVICE, VEHICLE, AND MECHANICAL DEVICE

(71) Applicant: NSK LTD., Tokyo (JP)

(72) Inventor: Kouhei Dobashi, Fujisawa (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 16/344,694

(22) PCT Filed: Jul. 18, 2018

(86) PCT No.: PCT/JP2018/026983
§ 371 (c)(1),
(2) Date: Apr. 24, 2019

(87) PCT Pub. No.: WO2019/082457
PCT Pub. Date: May 2, 2019

(65) Prior Publication Data
US 2020/0378739 A1    Dec. 3, 2020

(30) Foreign Application Priority Data
Oct. 26, 2017    (JP) .............................. JP2017-207185

(51) Int. Cl.
*G01B 5/14* (2006.01)
*F16H 25/22* (2006.01)

(52) U.S. Cl.
CPC ............ *G01B 5/14* (2013.01); *F16H 25/2204* (2013.01)

(58) Field of Classification Search
CPC ....... G01B 5/14; G01B 5/146; F16H 25/2204; F16H 2025/2481
USPC ......................................................... 33/701
See application file for complete search history.

(56) References Cited

U.S. PATENT DOCUMENTS

2006/0207361 A1 * 9/2006 Kazuno ................... F16H 25/24
                                                              74/89.44
2009/0301246 A1 * 12/2009 Yoshida .............. F16H 25/2247
                                                              74/424.91
(Continued)

FOREIGN PATENT DOCUMENTS

CN        104764432 A  *  7/2015
CN        108709483 A  * 10/2018
(Continued)

OTHER PUBLICATIONS

International Search Report (PCT/ISA/210) dated Oct. 16, 2018 issued by the International Searching Authority in International Application No. PCT/JP2018/026983.
(Continued)

*Primary Examiner* — Yaritza Guadalupe-McCall
(74) *Attorney, Agent, or Firm* — Sughrue Mion, PLLC

(57) ABSTRACT

An apparatus of measuring axial clearance of a ball screw device is capable of measuring axial clearance with high accuracy by easily attaching a ball screw device to be measured without requiring special attention. This apparatus includes a support unit that supports a nut as one member of the nut and a screw shaft threadedly engaged with each other, a measuring unit that measures a displacement amount of the screw shaft as the other member in an axial direction, a load applying unit that applies a load to the screw shaft in directions opposite to each other along the axial direction, and a posture correction unit that is provided between the screw shaft and the load applying unit to hold the nut and the screw shaft to be relatively displaceable.

6 Claims, 2 Drawing Sheets

(56) References Cited

U.S. PATENT DOCUMENTS

| | | | |
|---|---|---|---|
| 2015/0020628 A1* | 1/2015 | Jeng | F16H 25/2204 74/424.81 |
| 2017/0097221 A1 | 4/2017 | Hidaka et al. | |
| 2020/0378739 A1* | 12/2020 | Dobashi | G01B 5/14 |

FOREIGN PATENT DOCUMENTS

| | | | | |
|---|---|---|---|---|
| CN | 208187315 U | * | 12/2018 | |
| CN | 208313263 U | * | 1/2019 | |
| CN | 209655953 U | * | 11/2019 | |
| DE | 202009017874 U1 | * | 3/2011 | ............ G01M 13/00 |
| DE | 102009060528 A1 | * | 6/2011 | ............ G01M 13/04 |
| DE | 102012008106 A1 | * | 10/2013 | ............ G01B 5/146 |
| JP | S61-221601 A | | 10/1986 | |
| JP | 4-76401 B2 | | 12/1992 | |
| JP | 11-183327 A | | 7/1999 | |
| JP | 2004-257466 A | | 9/2004 | |
| JP | 2013-167642 A | | 8/2013 | |
| JP | 2016-109483 A | | 6/2016 | |
| JP | 2017-072455 A | | 4/2017 | |

OTHER PUBLICATIONS

Written Opinion (PCT/ISA/237) dated Oct. 16, 2018 issued by the International Searching Authority in International Application No. PCT/JP2018/026983.
Communication dated Nov. 18, 2020, from the European Patent Office in counterpart European Application No. 18869714.8.

* cited by examiner

METHOD AND APPARATUS OF MEASURING AXIAL CLEARANCE OF BALL SCREW DEVICE, AND METHODS OF MANUFACTURING BALL SCREW DEVICE, VEHICLE, AND MECHANICAL DEVICE

TECHNICAL FIELD

The present invention relates to a method and an apparatus of measuring axial clearance of a ball screw device, and methods of manufacturing a ball screw device, a vehicle, and a mechanical device.

BACKGROUND ART

Patent Document 1 discloses a method and an apparatus of measuring clearance of a ball screw for measuring, in a state where a nut is threadedly engaged with a screw shaft of the ball screw, axial clearance between the screw shaft and the nut. In order to measure the axial clearance of the ball screw with this apparatus, the nut threadedly engaged with the screw shaft is fixed to a leaf spring. In this state, the screw shaft is rotated in one direction to move the nut in one direction and thus the leaf spring is bent in one direction. Thus, a pressing force is applied to the screw shaft from the nut. This state is set as an initial state and further, the screw shaft is rotated in the other direction from the initial state to move the nut in the other direction. At this time, the rotation angle of the screw shaft and the movement amount of the nut when the leaf spring is returned to a neutral state and then bent in the other direction are detected. The axial clearance of the ball screw is measured by measuring the length of a non-sensing region in which the nut stops moving in the neutral state.

PRIOR ART DOCUMENT

Patent Document

Patent Document 1: Japanese Examined Patent Application Publication No. H04-76401

SUMMARY OF THE INVENTION

Problems to be Solved by the Invention

In the measurement technique of Patent Document 1, the posture deviation such as eccentricity and inclination occurring in between the center axes of the nut and the screw shaft results in a measurement error, and thus the measurement accuracy may deteriorate. Therefore, it is necessary to precisely attach the nut and the screw shaft to the apparatus so that there is no eccentricity or displacement in between the center axes of the nut and the screw shaft. Therefore, it requires time and labor to attach the nut and the screw shaft to the apparatus, and it is expected that it will be difficult to perform measurement in a short period of time, to use the technique in a mass production process, and to achieve automatization.

An object of the present invention is to provide a method and an apparatus capable of measuring axial clearance of a ball screw device with high accuracy by easily attaching a ball screw device to be measured without requiring special attention, and methods of manufacturing a ball screw device, a vehicle, and a mechanical device.

Means for Solving the Problems

The present invention includes the following configurations.

(1) A method of measuring axial clearance of a ball screw device including:

supporting one member of a nut and a screw shaft threadedly engaged with each other;

applying a load to the other member of the nut and the screw shaft in directions opposite to each other along an axial direction while holding the one member and the other member to be relatively displaceable; and measuring a displacement amount of the other member.

According to the method of measuring axial clearance of a ball screw device, by applying a load in the directions opposite to each other along the axial direction and measuring the displacement amount of the screw shaft or the nut in the axial direction, the axial clearance between the nut and screw shaft can be easily measured.

At this time, since the nut and the screw shaft are held to be relatively displaceable, the nut and the screw shaft are held in a posture with which the nut and the screw are evenly threadedly engaged. Accordingly, it is possible to suppress generation of a measurement error due to posture deviation such as eccentricity and inclination occurring in between the center axes of the nut and the screw shaft as much as possible. Thus, it is possible to measure the axial clearance between the nut and the screw shaft with high accuracy while reducing the time and the labor required to precisely attach the nut and screw shaft to the apparatus so that there is no eccentricity or inclination in between the center axes of the nut and the screw shaft. Accordingly, the axial clearance between the nut and the screw shaft can be measured easily and in a short period of time, whereby the method can be used in a mass production process and automatization can be achieved.

(2) The method of measuring axial clearance of a ball screw device according to (1), wherein in the step of applying a load to the other member, the other posture is corrected with degrees of freedom of translation in two different directions in a plane perpendicular to the axial direction and at least two degrees of freedom of rotation with the two different directions in the plane perpendicular to the axial direction as rotational axes.

According to the method of measuring axial clearance of a ball screw device, the posture of the nut or the screw shaft is corrected with the degrees of freedom of translation in two different directions in the plane perpendicular to the axial direction and at least two degrees of freedom of rotation with the two different directions in the plane perpendicular to the axial direction as rotational axes. Thus, when a load is applied, it is possible to smoothly correct the eccentricity and the inclination in the respective center axes to hold the nut and the screw shaft in a posture in which the nut and the screw are more evenly threadedly engaged. Accordingly, the axial clearance between the nut and the screw shaft can be measured with higher accuracy.

(3) An apparatus of measuring axial clearance of a ball screw device including:

a support unit that supports one member of a nut and a screw shaft threadedly engaged with each other;

a measuring unit that measures a displacement amount of the other member of the nut and the screw shaft in an axial direction;

a load applying unit that applies a load to the other member in directions opposite to each other along the axial direction; and a posture correction unit that is provided between the other member and the load applying unit or between the one member and the support unit to hold the one member and the other member to be relatively displaceable.

According to the apparatus of measuring axial clearance of a ball screw device, by applying a load by the load applying unit in the directions opposite to each other along the axial direction and measuring the position of the screw shaft or the nut in the axial direction by the measuring unit to obtain the displacement amount, the axial clearance between the nut and the screw shaft can be easily measured.

At this time, since the nut and the screw shaft are held to be relatively displaceable by the posture correction unit, when a load is applied by the load applying unit, the eccentricity and inclination in the respective center axes are corrected without regulating the posture of the nut and the screw shaft. Thus, the nut and the screw shaft are held at a posture of being evenly threadedly engaged, and a measurement error is suppressed form being generated due to posture deviation such as eccentricity and inclination occurring in between the center axes of the nut and the screw shaft. Accordingly, it is possible to measure the axial clearance between the nut and the screw shaft with high accuracy while reducing the time and the labor required to precisely attach the nut and screw shaft to the apparatus so that there is no eccentricity or inclination in between the center axes of the nut and the screw shaft. As a result, the axial clearance between the nut and the screw shaft can be measured easily and in a short period of time, whereby the apparatus can be used in a mass production process and automatization can be achieved.

(4) The apparatus of measuring axial clearance of a ball screw device according to (3), wherein the posture correction unit includes a translation correction unit having degrees of freedom of translation in two different directions in a plane perpendicular to the axial direction, and a rotation correction unit having at least two degrees of freedom of rotation with the two different directions in the plane perpendicular to the axial direction as rotational axes.

According to the apparatus of measuring axial clearance of a ball screw device, when a load is applied by the load applying unit, the eccentricity and the inclination in between the center axes of the nut and the screw shaft are corrected by the translation correction unit and the rotation correction unit of the posture correction unit with the degrees of freedom of translation in the two different directions in the plane perpendicular to the axial direction and at least the two degrees of freedom of rotation with the two different directions in the plane perpendicular to the axial direction as rotational axes. Accordingly, it is possible to hold the posture in which the nut and the screw shaft are more evenly threadedly engaged, and the axial clearance between the nut and the screw shaft can be measured with higher accuracy.

(5) The apparatus of measuring axial clearance of a ball screw device according to (3) or (4), wherein the nut is supported by the support unit, and the screw shaft is applied with a load through the posture correction unit and a displacement amount thereof is measured by the measuring unit.

According to the apparatus of measuring axial clearance of a ball screw device, a load is applied through the posture correction unit to the screw shaft threadedly engaged with the nut that is supported by the support unit. Thus, the axial clearance between the nut and the screw shaft can be measured with high accuracy by applying a load to the screw shaft while suppressing the eccentricity and inclination in the center axis of the screw shaft with respect to the center axis of the nut.

(6) The apparatus of measuring axial clearance of a ball screw device according to (3) or (4), wherein the screw shaft is supported by the support unit, and the nut is applied with a load through the posture correction unit and a displacement amount thereof is measured by the measuring unit.

According to the apparatus of measuring axial clearance of a ball screw device, a load is applied through the posture correction unit to the nut threadedly engaged with the screw shaft supported by the support unit. Thus, the axial clearance between the nut and the screw shaft can be measured with high accuracy by applying a load is applied to the nut while suppressing the eccentricity and inclination in the center axis of the nut with respect to the center axis of the screw shaft.

(7) A method of manufacturing a ball screw device including:

a measurement step using the method of measuring axial clearance of a ball screw device according to (1) or (2).

According to the method of manufacturing a ball screw device, it is possible to measure the axial clearance between the nut and the screw shaft easily and in a short period of time, and the productivity of a ball screw device can be improved.

(8) A method of manufacturing a ball screw device including:

a measurement step of measuring axial clearance using the apparatus of measuring axial clearance of a ball screw device according to any one of (3) to (6).

According to the method of manufacturing a ball screw device, it is possible to manufacture a high quality ball screw device in which axial clearance between a nut and a screw shaft is measured with high accuracy.

(9) A method of manufacturing a vehicle using the method of manufacturing a ball screw device according to (8).

According to the method of manufacturing a vehicle, it is possible to manufacture a vehicle including a high quality ball screw device.

(10) A method of manufacturing a mechanical device using the method of manufacturing a ball screw device according to (8).

According to the method of manufacturing a mechanical device, it is possible to manufacture a mechanical device including a high quality ball screw device.

Effect of the Invention

According to the present invention, it is possible to measure axial clearance with high accuracy by easily attaching a ball screw device to be measured without requiring special attention.

DESCRIPTION OF EMBODIMENTS

Hereinafter, embodiments of the present invention will be described in detail with reference to the drawings.

Figure 1:
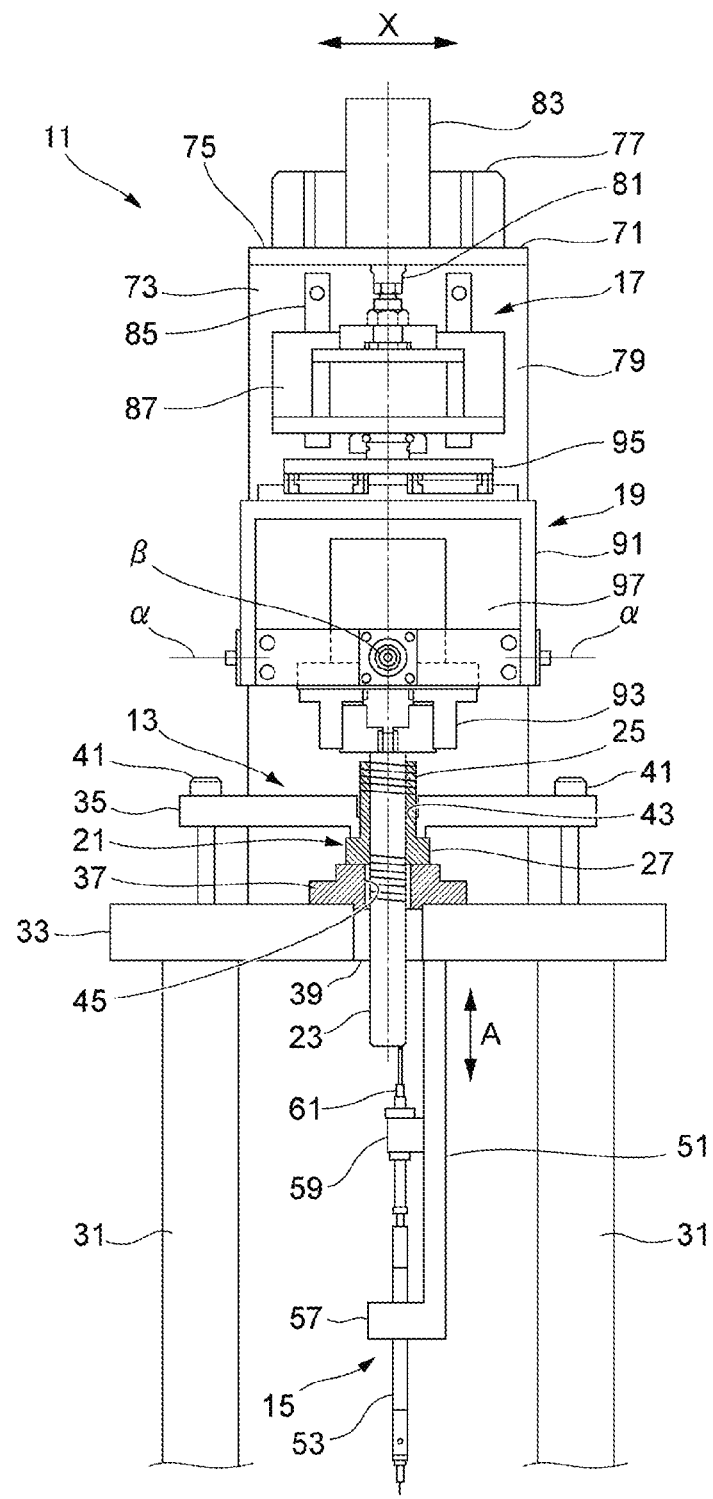
FIG. 1 is a cross-sectional view of an apparatus of measuring axial clearance of a ball screw device according to an embodiment.

FIG. 1 illustrates an apparatus of measuring axial clearance of a ball screw device according to an embodiment.

As illustrated in FIG. 1, an apparatus 11 of measuring axial clearance of a ball screw device according to the embodiment mainly includes a support unit 13, a measuring unit 15, a load applying unit 17, and a posture correction unit 19.

The measurement apparatus 11 is the apparatus of measuring axial clearance between a nut 21 and a screw shaft 23 which are threadedly engaged with each other. The nut 21 includes a nut main body 25, and a flange portion 27 that is formed at one end of the nut main body 25. The screw shaft 23 is screwed into a screw hole of the nut 21 and threadedly engaged with the nut. The ball screw device including the nut 21 and the screw shaft 23 has a structure in which a plurality of rolling elements (for example, balls) are provided between the nut 21 and the screw shaft 23 to be capable of endless circulating. The nut 21 may have a shape not provide with the flange portion 27. In this case, an upper end surface of the nut main body 25 is pressed or an outer diameter portion of the nut main body 25 is gripped, so that the nut is fixed to the support unit 13.

The support unit 13 constitutes a base of the measurement apparatus 11 and includes leg portions 31. The support unit 13 includes a table 33, a pressing plate 35, and a holding member 37. The table 33 is a rectangular plate supported on the floor surface by the leg portions 31, and an insertion hole 39 is formed at the center thereof. The pressing plate 35 is disposed above the table 33, and is fixed to the table 33 by a plurality of bolts 41. The pressing plate 35 includes a fitting hole 43 at the center thereof, and the nut main body 25 of the nut 21 with the flange portion 27 facing downward is fitted into the fitting hole 43 from the lower side. The holding member 37 is formed in a disc shape, and includes a through hole 45 formed at the center thereof. The holding member 37 is disposed on the table 33 such that the through hole 45 communicates with the insertion hole 39 of the table 33. Into the through hole 45 of the holding member 37 and the insertion hole 39 of the table 33 which are communicated with each other, the screw shaft 23 threadedly engaged with the nut 21 is inserted.

The measuring unit 15 is provided on the table 33 of the support unit 13. The measuring unit 15 includes a stay 51 and a measuring tool 53. The stay 51 is formed in a rod shape, and one end thereof is fixed to the vicinity of the insertion hole 39 in the lower surface of the table 33. The stay 51 is formed in an L shape including an attachment portion 57 at the other end. The measuring tool 53 is attached to the attaching portion 57 at the other end of the stay 51. Further, the stay 51 is provided with a bracket 59. A probe 61 of the measuring tool 53 is supported on the bracket 59. A tip end of the probe 61 is brought into contact with a lower end of the screw shaft 23 supported by the support unit 13. In the measuring unit 15, when the screw shaft 23 is displaced in an axial direction A, the probe 61 of the measuring tool 53 is displaced. Thus, a displacement amount of the screw shaft 23 in the axial direction A is obtained from the measured value of the measuring tool 53.

The load applying unit 17 is disposed above the support unit 13 through the posture correction unit 19. The load applying unit 17 is supported in a frame body 71 in addition to the posture correction unit 19. The frame body 71 includes a pair of side plate portions 73 and a top plate portion 75.

The side plate portions 73 are erected on the table 33 of the support unit 13, and upper ends thereof are linked to the top plate portion 75.

The load applying unit 17 includes a driving unit 77 and a pressing unit 79. The driving unit 77 is fixed to the top plate portion 75 of the frame body 71. The driving unit 77 includes a rod 81 which is raised and lowered by a drive source such as a bellofram-type air cylinder or a drive motor. The rod 81 protrudes downward from the top plate portion 75. The pressing unit 79 includes slide rails 85 and a pressing block 87. The slide rails 85 are fixed to the side plate portion 73 of the frame body 71, and are arranged in a vertical direction. The pressing block 87 is supported to be slidable in the vertical direction along the slide rails 85 between the side plate portions 73 of the frame body 71. The rod 81 of the driving unit 77 is linked to the pressing block 87 of the pressing unit 79. Thus, in the load applying unit 17, as the rod 81 of the driving unit 77 moves forward and backward, the pressing block 87 of the pressing unit 79 is driven to move up and down.

Figure 2:
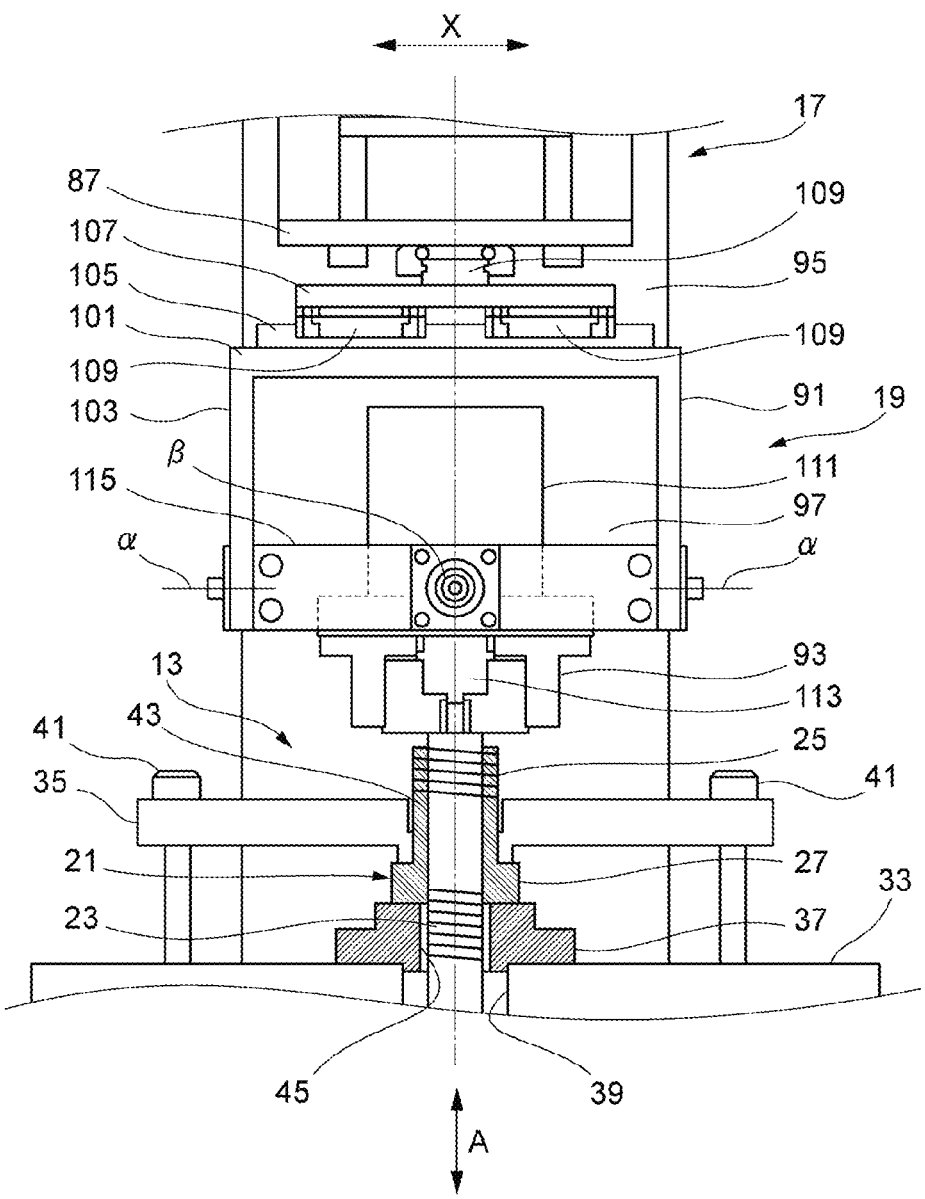
FIG. 2 is an enlarged cross-sectional view of the vicinity of a posture correction unit of the apparatus of measuring axial clearance of a ball screw device according to the embodiment.

As illustrated in FIG. 2, the posture correction unit 19 includes a bracket 91, a chuck unit 93, a translation correction unit 95, and a rotation correction unit 97. The translation correction unit 95 is provided on the bracket 91 and is disposed between the pressing block 87 of the load applying unit 17 and the bracket 91. The rotation correction unit 97 is provided between the bracket 91 and the chuck unit 93.

The bracket 91 includes a rectangular upper plate portion 101 and peripheral wall portions 103 extending downward from the periphery of the upper plate portion 101.

The translation correction unit 95 includes a support plate 105, a slide plate 107, and a plurality of sliders 109. The sliders 109 are provided between the support plate 105 and the slide plate 107 and above the slide plate 107. The translation correction unit 95 is attached to the bracket 91 by fixing the support plate 105 to the upper plate portion 101 of the bracket 91. Thus, the translation correction unit 95 is disposed between the bracket 91 and the pressing block 87. The slide plate 107 can be slid in an X direction in a plane perpendicular to the axial direction A with respect to the upper plate portion 101 by the sliders 109 between the slide plate 107 and the upper plate portion 101 of the bracket 91. In addition, the slide plate 107 can be slid relative to the pressing block 87 by the sliders 109 between the slide plate 107 and the pressing block 87 in a Y direction (in a direction orthogonal to a paper plane in FIGS. 1 and 2) orthogonal to the X direction in the plane perpendicular to the axial direction A. Thus, the bracket 91 of the posture correction unit 19 has degrees of freedom of translation in two directions (X and Y directions) orthogonal to each other in the plane perpendicular to the axial direction A. The degrees of freedom of translation of the posture correction unit 19 are in two directions orthogonal to each other but may be in two directions as long as the two directions are different with each other.

The chuck unit 93 includes a chuck main body 111 and a gripping portion 113. The gripping portion 113 of the chuck unit 93 grips the upper end portion of the screw shaft 23 supported by the support unit 13. The gripping portion 113 grips and releases the screw shaft 23 by a driving unit provided in the chuck main body 111.

The rotation correction unit 97 includes a frame 115. The frame 115 is supported by the bracket 91, and the chuck unit 93 is supported by the frame 115. The frame 115 is supported to be rotatable about a rotational axis α in the X direction in the plane perpendicular to the axial direction A with respect to the peripheral wall portion 103 of the bracket 91. In addition, the chuck unit 93 is supported to be rotatable about a rotational axis β in the Y direction in the plane perpendicular to the axial direction A with respect to the frame 115. Thus, the chuck unit 93 of the posture correction unit 19 has degrees of freedom of rotation that the chuck unit rotates about the rotational axes α and β in the two directions (X and Y directions) orthogonal to each other in the plane perpendicular to the axial direction A.

Next, a method of measuring axial clearance of a ball screw device using the apparatus 11 of measuring axial clearance of a ball screw device having the above structure will be described.

(Setting of Ball Screw Device)

The nut 21 and the screw shaft 23 constituting the ball screw device to be measured are threadedly engaged with each other. The nut main body 25 of the nut 21 is fitted into the fitting hole 43 of the pressing plate 35 from the lower side. The screw shaft 23 is inserted into the through hole 45 of the holding member 37 disposed on the table 33 and the insertion hole 39 of the table 33 communicating with the insertion hole 39. The holding plate 35 is fastened to the table 33 with the bolts 41, and the nut 21 and the screw shaft 23 threadedly engaged with each other are fixed to the table 33. In this manner, the nut 21 and the screw shaft 23 are supported by the support unit 13, and the lower end portion of the screw shaft 23 protruding toward the lower side of the table 33 is brought into contact with the probe 61 of the measuring unit 15. Thereafter, the upper end portion of the screw shaft 23 supported by the support unit 13 is gripped by the chuck unit 93 of the posture correction unit 19.

(Measurement of Axial Clearance)

The nut 21 and the screw shaft 23 constituting the ball screw device are set in the measurement apparatus 11, and then the rod 81 is caused to protrude by the driving unit 77 of the load applying unit 17 to lower the pressing block 87 of the pressing unit 79. Then, the posture correction unit 19 is pressed down by the lowered pressing block 87 and the screw shaft 23 gripped by the chuck unit 93 of the posture correction unit 19 is pressed down. In this state, the position of the lower end of the screw shaft 23 is measured by the measuring tool 53 of the measuring unit 15.

Next, the rod 81 is pulled by the driving unit 77 of the load applying unit 17, and the pressing block 87 of the pressing part 79 is raised. Then, the posture correction unit 19 is pulled up by the rising pressing block 87, and the screw shaft 23 gripped by the chuck unit 93 of the posture correction unit 19 is pulled up. In this state, the position of the lower end of the screw shaft 23 is measured by the measuring tool 53 of the measuring unit 15.

From the value measured by the measuring unit 15 at the time of pressing down and pulling up by load applying unit 17, the displacement amount of the screw shaft 23 in the axial direction A with respect to the nut 21 of the ball screw device is obtained. Then, the displacement amount obtained from the value measured by the measuring unit 15 at the time of pressing down or pulling up by the load applying unit 17 corresponds to the axial clearance between the nut 21 and the screw shaft 23.

Incidentally, when measuring the displacement amount of the screw shaft 23 in the axial direction A with respect to the nut 21, if the posture deviation occurs such as eccentricity and inclination in between the center axes of the nut 21 and the screw shaft 23, a measurement error may be generated, resulting in deterioration in the measurement accuracy.

In contrast, according to the embodiment, the load applying unit 17 applies a load in directions opposite to each other along the axial direction A, and the measuring unit 15 measures the position of the screw shaft 23 in the axial direction A, thereby obtaining the displace amount, so that the axial clearance between the nut 21 and the screw shaft 23 can be easily measured.

At this time, the screw shaft 23 is held to be displaceable relative to the nut 21 by the posture correction unit 19. Specifically, the nut 21 and the screw shaft 23 are displaceable relative to each other by the translation correction unit 95 having degrees of freedom of translation in the two directions (X direction and Y direction) orthogonal to each other in the plane perpendicular to the axial direction A and the rotation correction unit 97 having two degrees of freedom of rotation with the two directions (X direction and Y direction) orthogonal to each other in the plane perpendicular to the axial direction A as the rotational axes α and β. Accordingly, when a load is applied by the load applying unit 17, the eccentricity and the inclination in between the respective center axes are corrected without regulating the posture of the nut 21 and the screw shaft 23. That is, the posture correction unit 19 corrects the posture of the nut 21 and the screw shaft 23 with the above degrees of freedom.

Thus, the nut 21 and the screw shaft 23 are held at the posture of being evenly threadedly engaged, so that it is possible to suppress a measurement error due to the posture deviation such as eccentricity and inclination in between the respective center axes of the nut 21 and the screw shaft 23 as much as possible. Accordingly, it is possible to measure the axial clearance between the nut 21 and the screw shaft 23 with high accuracy while reducing the time and the labor required to precisely attach the nut and the screw shaft to the apparatus such that there is no eccentricity or inclination in between the center axes of the nut 21 and the screw shaft 23. Therefore, the axial clearance between the nut 21 and the screw shaft 23 can be measured easily and in a short period of time, whereby the embodiment can be used in a mass production process and automatization can be achieved.

In the embodiment, a load is applied to the screw shaft 23 through the posture correction unit 19 by the load applying unit 17 installed on the upper side. However, the load applying unit 17 may be installed on the lower side, and a load may be applied to the screw shaft 23 from below through the posture correction unit 19.

The load applying units 17 may be respectively installed on the upper and lower sides interposing the posture correction unit 19 therebetween, and a load may be applied to screw shaft 23 by the upper and lower load applying units 17. In this case, how to apply a load to the screw shaft 23 is to apply pressing force to the screw shaft 23 alternately by the upper and lower load applying units 17, or to apply tensile force to the screw shaft 23 alternately by the upper and lower load applying units 17, or to load pressing force and tensile force respectively on the screw shaft 23 by the upper and lower load applying units 17.

In the embodiment, the measuring unit 15 measures the displacement of the screw shaft 23 by bringing the probe 61 into contact with the lower end portion of the screw shaft 23. However, the probe 16 of the measuring unit 15 provided above the screw shaft 23 may be brought into contact with the upper end portion of the screw shaft 23 to measure the displacement of the screw shaft 23.

In the embodiment, a load is applied to the screw shaft 23 by fixing the nut 21 to the support unit 13. However, a load may be applied to the nut 21 by fixing the screw shaft 23 to the support unit 13 to measure the displacement amount of the nut 21 by the measuring unit 15.

In the embodiment, a load is applied to the screw shaft 23 by the load applying unit 17 through the posture correction unit 19, but the invention is not limited thereto. For example, the nut 21 may be supported by the support unit 13 through the posture correction unit 19 and a load may be directly applied to the screw shaft 23 by the load applying unit 17 to measure the displacement of the screw shaft 23 in the vicinity of the center axis by the measuring unit 15.

In addition, as the measuring unit 15, as long as the displacement in the axial direction can be measured, various general displacement gauges can be used. Further, the measuring unit 15 may be a non-contact type displacement gauge.

The present invention is not limited to the above embodiment. In the present invention, it is expected that those skilled in the art will change or apply the matters based on mutual combination of each configuration of the embodiments, the description of the specification, and known techniques, and such a change or application is included in the range to be protected.

For example, the apparatus and method of measuring axial clearance of a ball screw device according to the present invention can be applied to mechanical devices (regardless of the type of power) such as various manufacturing apparatuses or the like including a ball screw device, and apparatuses and methods of manufacturing vehicles such as automobiles, motorcycles, and railways.

By incorporating the ball screw device manufactured by performing the measurement step of measuring the axial clearance of the ball screw device using the apparatus and the method of measuring the axial clearance of a ball screw device according to the present invention into mechanical devices (regardless of the type of power) and vehicles, high quality mechanical devices and vehicles can be obtained.

The application is based on Japanese Patent Application (No. 2017-207185) filed Oct. 26, 2017, the content of which is incorporated herein by reference.

DESCRIPTION OF REFERENCE NUMERALS

11: Apparatus of measuring axial clearance
13: Support unit
15: Measuring unit
17: Load applying unit
19: Posture correction unit
21: Nut
23: Screw shaft
95: Translation correction unit
97: Rotation correction unit
A: Axial direction
α, β: Rotational axis

The invention claimed is:

1. A method of measuring axial clearance of a ball screw device comprising:
supporting one member of a nut and a screw shaft threadedly engaged with each other;
applying a load to the other member of the nut and the screw shaft in directions opposite to each other along an axial direction while holding the one member and the other member to be relatively displaceable; and
measuring a displacement amount of the other member.

2. The method of measuring axial clearance of a ball screw device according to claim 1,
wherein when a load is applied to the other member, the other posture is corrected with degrees of freedom of translation in two different directions in a plane perpendicular to the axial direction and at least two degrees of freedom of rotation with the two different directions in the plane perpendicular to the axial direction as rotational axes.

3. An apparatus of measuring axial clearance of a ball screw device comprising:
a support unit that supports one member of a nut and a screw shaft threadedly engaged with each other;
a measuring unit that measures a displacement amount of the other member of the nut and the screw shaft in an axial direction;
a load applying unit that applies a load to the other member in directions opposite to each other along the axial direction; and
a posture correction unit that is provided between the other member and the load applying unit or between the one member and the support unit to hold the one member and the other member to be relatively displaceable.

4. The apparatus of measuring axial clearance of a ball screw device according to claim 3,
wherein the posture correction unit includes a translation correction unit having degrees of freedom of translation in two different directions in a plane perpendicular to the axial direction, and a rotation correction unit having at least two degrees of freedom of rotation with the two different directions in the plane perpendicular to the axial direction as rotational axes.

5. The apparatus of measuring axial clearance of a ball screw device according to claim 3,
wherein the nut is supported by the support unit, and the screw shaft is applied with a load through the posture correction unit and a displacement amount thereof is measured by the measuring unit.

6. The apparatus of measuring axial clearance of a ball screw device according to claim 3,
wherein the screw shaft is supported by the support unit, and the nut is applied with a load through the posture correction unit and a displacement amount thereof is measured by the measuring unit.

* * * * *